United States Patent
Nicolas et al.

(10) Patent No.: US 11,169,106 B2
(45) Date of Patent: Nov. 9, 2021

(54) DEVICE AND METHOD FOR NONDESTRUCTIVE INSPECTION OF A FLEXIBLE UNDERWATER PIPE

(71) Applicant: TECHNIP FRANCE, Courbevoie (FR)

(72) Inventors: Yann Nicolas, Rueil Malmaison (FR); Jean-Marc Decitre, Marcoussis (FR); Laura Pucci, Sceaux (FR); Denis Premel, Antony (FR)

(73) Assignee: TECHNIP FRANCE

( * ) Notice: Subject to any disclaimer, the term of this patent is extended or adjusted under 35 U.S.C. 154(b) by 169 days.

(21) Appl. No.: 16/480,518

(22) PCT Filed: Jan. 24, 2018

(86) PCT No.: PCT/EP2018/051734
§ 371 (c)(1),
(2) Date: Jul. 24, 2019

(87) PCT Pub. No.: WO2018/138151
PCT Pub. Date: Aug. 2, 2018

(65) Prior Publication Data
US 2019/0391097 A1    Dec. 26, 2019

(30) Foreign Application Priority Data
Jan. 24, 2017 (FR) ...................... 1700061

(51) Int. Cl.
*G01N 27/22* (2006.01)
*G01N 27/02* (2006.01)

(52) U.S. Cl.
CPC ................. *G01N 27/028* (2013.01)

(58) Field of Classification Search
CPC ...... G01N 27/22; G01N 27/228; G01N 27/02; G01N 27/028; G01M 3/181
See application file for complete search history.

(56) References Cited

U.S. PATENT DOCUMENTS

| 7,891,384 B2 * | 2/2011 | Binet | G01M 3/2846 |
| | | | 138/135 |
| 8,733,446 B2 * | 5/2014 | Espinasse | E21B 17/015 |
| | | | 166/350 |

(Continued)

FOREIGN PATENT DOCUMENTS

| DE | 35 04 609 A1 | 8/1986 |
| GB | 2 446 670 A | 8/2008 |

(Continued)

OTHER PUBLICATIONS

International Search Report dated Apr. 20, 2018 in corresponding PCT International Application No. PCT/EP2018/051734.

(Continued)

*Primary Examiner* — Walter L Lindsay, Jr.
*Assistant Examiner* — Milton Gonzalez
(74) *Attorney, Agent, or Firm* — Ostrolenk Faber LLP

(57) ABSTRACT

A method for nondestructive inspection of a flexible underwater pipe capable detecting a flooding of the annular space in which the armor layers are found. The method comprises the steps of arranging in the vicinity of the external sheath at least one pair of electrodes, measuring the impedance at the terminals of the pair of electrodes, at a frequency advantageously between 10 Hz and 10 MHz, and comparing the measured impedance with reference values so as to determine the nature of the fluid contained in the annular space.

19 Claims, 7 Drawing Sheets

(56) References Cited

U.S. PATENT DOCUMENTS 9,134,278 B2 * 9/2015 Klopffer .................. F17D 3/01
2016/0025663 A1 1/2016 Lehikoinen et al.

FOREIGN PATENT DOCUMENTS

| JP | 57146149 A | * | 9/1982 | ......... G01N 27/4114 |
| JP | 2011-027216 A | | 2/2011 | |
| WO | WO 97/00453 A1 | | 1/1997 | |

OTHER PUBLICATIONS

Written Opinion dated Feb. 28, 2018 in corresponding PCT International Application No. PCT/EP2017/079910.
Preliminary Search Report dated May 23, 2017 in corresponding French Patent Application No. 1700061.

* cited by examiner

DEVICE AND METHOD FOR NONDESTRUCTIVE INSPECTION OF A FLEXIBLE UNDERWATER PIPE

CROSS-REFERENCE TO RELATED APPLICATIONS

The present application is a 35 U.S.C. §§ 371 national phase conversion of PCT/EP2018/051734, filed Jan. 24, 2018, which claims priority to French Patent Application No. 1700061, filed Jan. 24, 2017, the contents of which are incorporated herein by reference. The PCT International Application was published in the French language.

TECHNICAL FIELD OF THE INVENTION

The present invention relates to a method for nondestructive inspection of a flexible line and an associated nondestructive inspection device.

It relates to the technical field of the nondestructive inspection of underwater oil and gas facilities, and more specifically that of the nondestructive inspection of the annular area of flexible underwater lines.

BACKGROUND OF THE INVENTION

A flexible line, used in the field of underwater oil and gas facilities, can assume the form of:

a flexible pipe of the unbonded type intended to transport hydrocarbons through a body of water, such as an ocean, sea, lake or river, and for example made according to normative documents API 17 J (Specification for Unbonded Flexible Pipe) and API RP 17 B (Recommended Practice for Flexible Pipe) established by the American Petroleum Institute, or an umbilical reinforced by armors intended to transport energies, data, or injection product, through a body of water, such as an ocean, sea, lake or river, and for example made according to normative documents API 17 E (Specification for Umbilicals), or a combination of the two.

Such a flexible line is generally formed by a set of coaxial and superimposed cylindrical layers. A flexible line comprises at least one armor layer arranged inside an annular space and an external sheath surrounding said annular space. The flexible line is considered "unbonded" within the meaning of the present invention when at least one of the layers of said flexible line is able to move longitudinally relative to the adjacent layers when the flexible line is bent. In particular, an unbonded flexible line is a flexible line generally with no bonding materials connecting the layers forming the flexible line.

The flexible line is generally positioned through a body of water, between a bottom assembly, designed to collect the fluid extracted from the bottom of the body of water, and a floating or stationary surface assembly designed to collect and distribute the fluid, or can also extend between two bottom facilities, or can also extend between two surface facilities. The surface assembly may be a semisubmersible platform, an FPSO or another floating assembly.

The flexible lines intended for significant depths are subject to very strong tensions, commonly several tens of tons, in particular during their commissioning and/or during their installation at sea. In particular, in the case where the surface assembly is floating and movable based on the sea conditions, the risers connecting the seabed to the surface assembly may sometimes be subject to millions of curve variation cycles. This results in damage and breakage risks of the external sheath, which then no longer performs its function of protecting the flexible line. There is then a risk of flooding of the annular space, in particular flooding of the tensile armor layer(s) present in said annular space. These armor layers are, in some cases, sensitive to corrosion, in particular that caused by the permeation of acid compounds present in the transported fluid and/or by the presence of water in the annular space following damage to the external sheath. Yet to guarantee the tensile and fatigue strength throughout the entire lifetime of the flexible line, it is necessary to guarantee the integrity of the tensile armor layers, generally made from helical winding of metal wires.

In order to detect any damage or breakage of the external sheath leading to flooding of the annular space, different tests are carried out, such as the annular test. The annular test consists of measuring the current volume of gas in the annular space of the flexible line, for example by creating a vacuum in the annular space. The current measured volume of gas is compared to the initial volume of the annular space to deduce therefrom whether water has partially or completely invaded the annular space. However, such a volume measurement is often imprecise and therefore does not make it possible to rule on the presence and height of any flooded areas threatening the integrity of the flexible line.

Document GB-B-2,446,670 describes a method for the underwater inspection of the integrity of the annular space of a flexible line based on the ultrasound echographic imaging technique. According to this method, an ultrasonic probe emits an incident ultrasonic wave that penetrates the flexible line. In return, the probe receives the ultrasonic waves reflected at the discontinuities, i.e., at the interfaces, encountered in the flexible line. The amplitudes of the reflected ultrasonic waves in particular make it possible to determine whether the portion of the inspected flexible line is flooded. Such a method is based on a property of the ultrasonic waves according to which the ultrasonic waves propagate little in a gas as opposed to a liquid medium such as water. Thus, an interface including a gas generates reflected ultrasonic waves of greater amplitude than an interface including a liquid.

However, the ultrasonic method reaches its limits when the flexible line is subject both to an internal pressure and to an external pressure, which is in particular the case when said flexible line is submerged in a body of water. Indeed, in a flexible line configuration in which the external sheath and the armor layer are adjoining, the annular space filled with gas, and from a certain pressure level, generally above around ten bars, said external sheath and said armor layer are compressed against one another such that the interface between said external sheath and said armor layer no longer includes gas. This is then called close contact between the two layers. In such a case, the incident ultrasonic wave propagates primarily through the interface, and the reflected waves are of very small amplitude, like an annular space filled with liquid, such that it is impossible to determine the presence of the gas. Thus, when the contact pressure between the external sheath and the armor elements is greater than a few tens of bars, the inspection method described in patent GB-B-2,446,670 does not make it possible to distinguish between a flooded annular space and a dry annular space. In another flexible line configuration in which one or several intermediate sheaths are arranged between the external sheath and the armor layer, the different interfaces between the external sheath and the intermediate sheaths can include gas, such that the ultrasonic waves are directly reflected at these interfaces even before they have been able to reach the annular space. Here also, the inspection method described in patent GB-B-2,446,670 does not make it possible to distinguish between a flooded annular space and a dry annular space.

Furthermore, an ultrasonic inspection method requires mechanical sweeping of a plurality of successive regions of the external sheath to be inspected and the repetition, for each region of the external sheath to be inspected, of the steps for sending, receiving, analysis and determination of the medium at the interface between the region of the external sheath to be inspected and the annular space facing the region of the external sheath to be inspected. Thus, it is generally necessary to mount the ultrasonic probe on a motorized turntable, the weight and implementing complexity of which are non-negligible.

The invention thus aims to provide a method for inspecting the integrity of a flexible line, in particular of the annular space of the flexible line, that is nonintrusive, easy to implement and reliable irrespective of the outside pressure applied to the flexible line.

BRIEF DESCRIPTION OF THE INVENTION

The solution proposed by the invention is a method for the nondestructive inspection of a flexible line comprising at least one armor layer arranged inside an annular space and an external sheath surrounding said annular space, said annular space comprising a fluid. The nondestructive inspection method is remarkable in that it comprises the following steps:

a) arranging at least one pair of electrodes in the vicinity of the external sheath, b) supplying alternating voltage of determined frequency, or alternating current of determined frequency, to said pair of electrodes, or a first pair of electrodes of said pairs of electrodes, so as to generate an electromagnetic field extending through at least part of the annular space, c) measuring, at said pair of electrodes, or at a second pair of electrodes of said pairs of electrodes, an electrical signal related to the electromagnetic characteristics of said at least one part of the annular space subject to said generated electromagnetic field, d) processing said electrical signal so as to determine the nature of the fluid contained in the annular space.

Advantageously, during step a), the at least one pair of electrodes is arranged outside said flexible line, near the external sheath.

In a variant, in step b), the supply of said pair of electrodes is with pulsed voltage, or pulsed current. Advantageously, the assembly formed by armors and fluid is subject to the electromagnetic field.

Advantageously, in step d), said electrical signal is compared with the reference values so as to determine the nature of the fluid contained in the annular space.

Thus, the nondestructive inspection method according to the invention makes it possible to inspect the nature of the fluid contained in the annular space of a flexible line, via an electromagnetic field that makes it possible to pass through one or several sheaths irrespective of the type of contact, close or not, between the external sheath, the armor layer, and optionally the intermediate sheaths. Likewise, this method has the advantage of requiring only one measurement and therefore making it possible to eliminate the implementation of a sweeping step.

The interaction of the electromagnetic field with the flexible line in particular depends on the geometry and electromagnetic properties of the different components present in the flexible line. The main electromagnetic properties are the electrical conductivity, the dielectric permittivity and the magnetic properties, in particular the magnetic permeability.

The external sheath of the flexible line is generally made from electrically insulating (practically nil electrical conductivity) and nonmagnetic (magnetic permeability identical to that of a vacuum) polymeric materials. Subsequently, the electromagnetic field can easily pass through the external sheath without undergoing strong attenuation, and reach the annular space.

Due to its electromagnetic properties, the fluid present in the annular space affects the electromagnetic field, and it is this influence that the present method aims to use in order to indirectly determine the nature of the fluid through electrical measurements.

Furthermore, the nondestructive inspection can be done on a standard flexible line without it being necessary to modify the flexible line structurally, all of the elements of the nondestructive inspection device being arranged outside the pipe, even if some of said elements of said nondestructive inspection device are able to interact electromagnetically with elements inside the flexible line.

In the present application, the term "alternating voltage" refers to a voltage that varies periodically as a function of time, the "determined frequency" being the frequency of this periodic function. The term "alternating voltage" is not limited to sinusoidal voltages and also encompasses non-sinusoidal periodic voltages, for example periodic voltages of the triangular or slotted type. Likewise, in the present application, the term "alternating current" refers to a current that varies periodically as a function of time.

Advantageously, during step b), the supply is done with a sinusoidal alternating voltage of determined frequency, or with a sinusoidal alternating current of determined frequency.

According to another advantageous feature of the invention making it possible to obtain a simple implementation method using a compact device, during step a), a single pair of electrodes is arranged near the external sheath.

According to still another advantageous feature of the invention making it possible to improve the sensitivity of the measurement, the sole armor layer, or when the flexible line comprises several armor layers, the armor layer closest to the external sheath, comprises at least a first group of armors and a second group of armors separate from one another, and in that step a) comprises the following steps:

a1) arranging a first electrode from the sole pair of electrodes opposite the first group of armors, a2) arranging a second electrode from the sole pair of electrodes opposite the second group of armors.

Advantageously, the first electrode from the sole pair of electrodes is placed exclusively opposite the first group of armors without being placed opposite the second group of armors. The second electrode from the sole pair of electrodes is placed exclusively opposite the second group of armors without being placed opposite the first group of armors.

According to still another advantageous feature of the invention making it possible to uncouple the measurement acquisition and the supply of alternating voltage or alternating current so as to improve the precision of the measurement, during step a), two electrode pairs are arranged in the vicinity of the external sheath, namely on the one hand a first pair of electrodes and on the other hand a second pair of electrodes.

According to still another advantageous feature of the invention making it possible to improve the sensitivity of the measurement, the sole armor layer, or when the flexible line comprises several armor layers, the armor layer closest to the external sheath, comprises at least a first group of armors and a second group of armors separate from one another, and in that step a) comprises the following steps:

a3) arranging a first electrode from the first pair of electrodes opposite the first group of armors, a4) arranging a second electrode from the first pair of electrodes opposite the second group of armors.

Advantageously, the first electrode from the first pair of electrodes is placed exclusively opposite the first group of armors without being placed opposite the second group of armors. The second electrode from the first pair of electrodes is placed exclusively opposite the second group of armors without being placed opposite the first group of armors.

According to still another advantageous feature of the invention making it possible to improve the sensitivity of the measurement, step a) comprises the following steps:

a5) arranging a first electrode from the second pair of electrodes opposite the first group of armors, a6) arranging a second electrode from the second pair of electrodes opposite the second group of armors.

Advantageously, the first electrode from the second pair of electrodes is placed exclusively opposite the first group of armors without being placed opposite the second group of armors. The second electrode from the second pair of electrodes is placed exclusively opposite the second group of armors without being placed opposite the first group of armors.

According to still another advantageous feature of the invention making it possible to improve the sensitivity of the measurement, the sole armor layer, or when the flexible line comprises several armor layers, the armor layer closest to the external sheath, comprises at least a third group of armors and a fourth group of armors separate from one another and separate from the first group of armors and the second group of armors, said third group of armors and said fourth group of armors being arranged between said first group of armors and said second group of armors, and step a) comprises the following steps:

a7) arranging a first electrode from the second pair of electrodes opposite the third group of armors, a8) arranging a second electrode from the second pair of electrodes opposite the fourth group of armors.

Advantageously, the first electrode from the second pair of electrodes is placed exclusively opposite the third group of armors without being placed opposite the first group of armors, the second group of armors or the fourth group of armors. The second electrode from the second pair of electrodes is placed exclusively opposite the fourth group of armors without being placed opposite the first group of armors, the second group of armors or the third group of armors.

According to still another advantageous feature of the invention making it possible to improve the sensitivity of the measurement, step a) comprises the following step:

a9) arranging the electrodes of at least one pair of electrodes in contact with the external sheath.

According to still another advantageous feature of the invention making it possible to guarantee good penetration of the electromagnetic field through the external sheath and any intermediate sheaths, as well as a good interaction of the electromagnetic field with the fluid contained in the annular space, step b) comprises the following step:

b1) supplying alternating voltage, or alternating current, with a determined frequency between 10 Hz and 10 MHz, advantageously between 100 kHz and 3 MHz, preferably between 200 kHz and 800 kHz or between 100 Hz and 200 kHz.

According to still another advantageous feature of the invention making it possible to obtain an electrical signal easily exploitable and measurable with commercially available measuring instruments, in the case where in step a) a single pair of electrodes is arranged near the external sheath, the electrical signal measured during step c) is the complex impedance across the terminals of said sole pair of electrodes. The impedance is said to be complex because it has a modulus and a phase, and it can be plotted in a complex plane. In this embodiment, the measured electrical signal is a complex signal, because it has a modulus and a phase, and can be plotted in a complex plane.

In the case where in step a) two pairs of electrodes are arranged near the external sheath, i.e., on the one hand a first electrode pair and on the other hand a second electrode pair, according to still another advantageous feature of the invention making it possible to obtain an electrical signal easily exploitable and measurable with commercially available measuring instruments, the electrical signal measured during step c) is a complex signal having a modulus and a phase. According to a first variant of this embodiment of the invention, the modulus of said complex signal is equal to the amplitude of the alternating voltage measured across the terminals of the second pair of electrodes, and the phase of said complex signal is equal to the phase shift measured between the alternating voltage across the terminals of the second pair of electrodes on the one hand, and the voltage or the alternating current supplying the first pair of electrodes on the other hand. According to a second variant of this embodiment of the invention, the modulus of said complex signal is equal to the ratio between the amplitude of the alternating voltage measured across the terminals of the second pair of electrodes on the one hand, and the amplitude of the alternating voltage supplying the first electrode pair on the other hand, and the phase of said complex signal is equal to the phase shift measured between the alternating voltage across the terminals of the second pair of electrodes on the one hand, and the alternating voltage supplying the first pair of electrodes on the other hand. This complex signal is the complex transmittance of the quadripole whereof the two input terminals are connected to the first pair of electrodes and the two output terminals are connected to the second pair of electrodes. According to a third variant of this embodiment of the invention, the modulus of said complex signal is equal to the ratio between the amplitude of the alternating voltage measured across the terminals of the second pair of electrodes on the one hand, and the amplitude of the alternating current supplying the first electrode pair on the other hand, and the phase of said complex signal is equal to the phase shift measured between the alternating current across the terminals of the second pair of electrodes on the one hand, and the alternating voltage supplying the first pair of electrodes on the other hand.

In the present application, the amplitude of an alternating voltage is defined by comparing the instantaneous voltage values during a period with the average value of the voltage over this period, the amplitude being equal to the maximum of the absolute values of the differences between, on the one hand, the instantaneous values, and on the other hand, the average value. In the case of a sinusoidal alternating voltage, the amplitude thus defined is equal to the actual voltage multiplied by the square root of two. Likewise, in the present application, the amplitude of an alternating current is defined by comparing the instantaneous current values during a period with the average value of the current over this period, the amplitude being equal to the maximum of the absolute values of the differences between, on the one hand, the instantaneous values, and on the other hand, the average value.

According to still another advantageous feature of the invention making it possible to use a complex signal simply, step d) comprises the following step:

d1) comparing the modulus and/or the phase of the measured electrical signal with reference values so as to determine the nature of the fluid contained in the annular space (13).

According to still another advantageous feature of the invention making it possible to guarantee the precision of the measurement, during steps b) and c), the distance separating the electrodes from the or each of the pairs of electrodes is kept fixed.

According to still another advantageous feature of the invention making it possible to ensure that a sufficient number of armors is arranged between the electrodes, during steps b) and c), the distance separating the electrodes from the or each of the pairs of electrodes is kept between 100 mm and 500 mm, preferably between 200 mm and 500 mm.

According to still another advantageous feature of the invention, the group of steps b), c) and d) is carried out several times, simultaneously or sequentially, with a different determined frequency for each execution.

Another aspect of the invention relates to a device for the nondestructive inspection of a flexible line comprising at least one armor layer arranged inside an annular space and an external sheath surrounding said annular space, said annular space comprising a fluid. The inspection device is remarkable in that it comprises:

an electromagnetic field generator configured to generate an electromagnetic field extending through at least part of the annular space, said electromagnetic field generator comprising:

at least one pair of electrodes intended to be arranged near the external sheath, a voltage, or current, generator configured to supply alternating voltage of determined frequency, respectively alternating current of determined frequency, to the sole pair of electrodes, or a first pair of electrodes of said pairs of electrodes, so as to generate an electromagnetic field extending through at least part of the annular space, a measuring instrument configured to measure, at said pair of electrodes, or at a second pair of electrodes of said pairs of electrodes, an electrical signal related to the electromagnetic characteristics of said at least one part of the annular space subject to said generated electromagnetic field, a comparator configured to compare said electrical signal with the reference values so as to determine the nature of the fluid contained in the annular space.

Advantageously, the at least one pair of electrodes is arranged outside said flexible line, near the external sheath.

In a variant, the supply of the sole pair of electrodes or the first pair of electrodes is with pulsed voltage, or pulsed current. Advantageously, the assembly formed by armors and fluid is subject to the electromagnetic field.

Thus, the nondestructive inspection device according to the invention makes it possible to inspect the nature of the fluid contained in the annular space of a flexible line, via an electromagnetic field able to pass through one or several sheaths irrespective of the type of contact, close or not, between the external sheath, the armor layer, and optionally the intermediate sheaths. Likewise, this device has the advantage of being effective as of the first measurement and therefore makes it possible to do away with the placement of a mechanical sweeping means of the turntable type.

According to still another advantageous feature of the invention allowing the generation of an optimal electromagnetic field, the electrodes of the pair(s) of electrodes comprise a conductive body made from metal, preferably from copper.

According to still another advantageous feature of the invention allowing the generation of an optimal electromagnetic field, the conductive body of the electrodes of the pair(s) of electrodes have a parallelepiped shape with a rectangular base, the length and width of which are between 20 mm and 250 mm, preferably with a square base with sides equal to 70 mm.

According to still another advantageous feature of the invention, making it possible simply to measure the impedance across the terminals of a pair of electrodes, the measuring instrument is a vector network analyzer.

DESCRIPTION OF THE FIGURES

Other particularities and advantages of the invention will emerge from reading the following description of particular embodiments of the invention, provided for information but non-limitingly, in reference to the appended drawings, in which.

Figure 10:
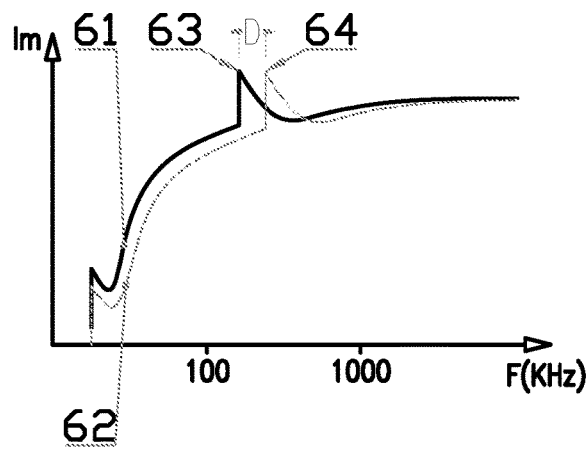

in broken lines, the curve of the reference values of the real part (Re) of the complex signal as a function of the determined frequency (F), corresponding to the case where the annular space of the flexible line contains a gas, and in solid lines, the curve of the real part (Re) of the complex signals measured as a function of the determined frequency (F), when the annular space of the flexible line contains a liquid, and the frequency shift (D) between the two curves;

FIG. 10 schematically shows:

in broken lines, the curve of the reference values of the imaginary part (Im) of the complex signal as a function of the determined frequency (F), corresponding to the case where the annular space of the flexible line contains a gas, and in solid lines, the curve of the imaginary part (Im) of the complex signals measured as a function of the determined frequency (F), when the annular space of the flexible line contains a liquid, and the frequency shift (D) between the two curves.

Figure 3:
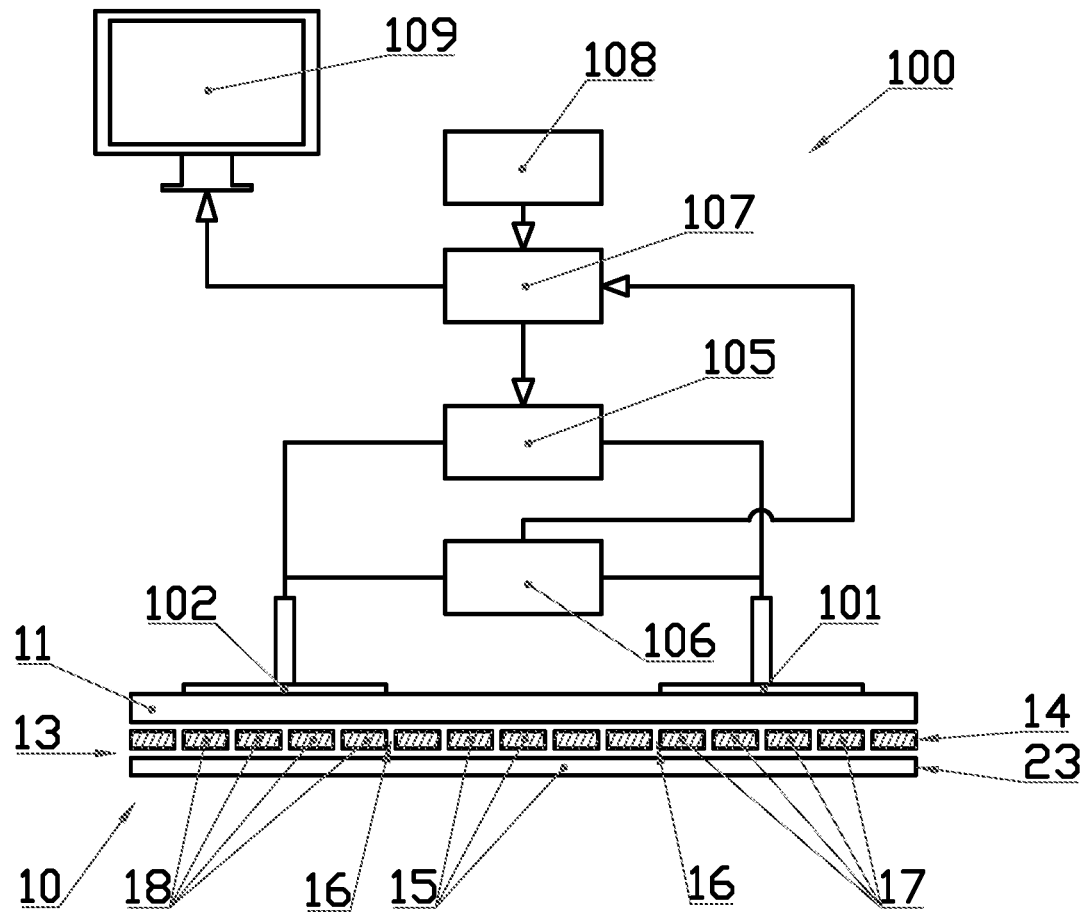
FIG. 3 is a schematic view of a first exemplary embodiment of the nondestructive inspection device according to the invention.
Figure 4:
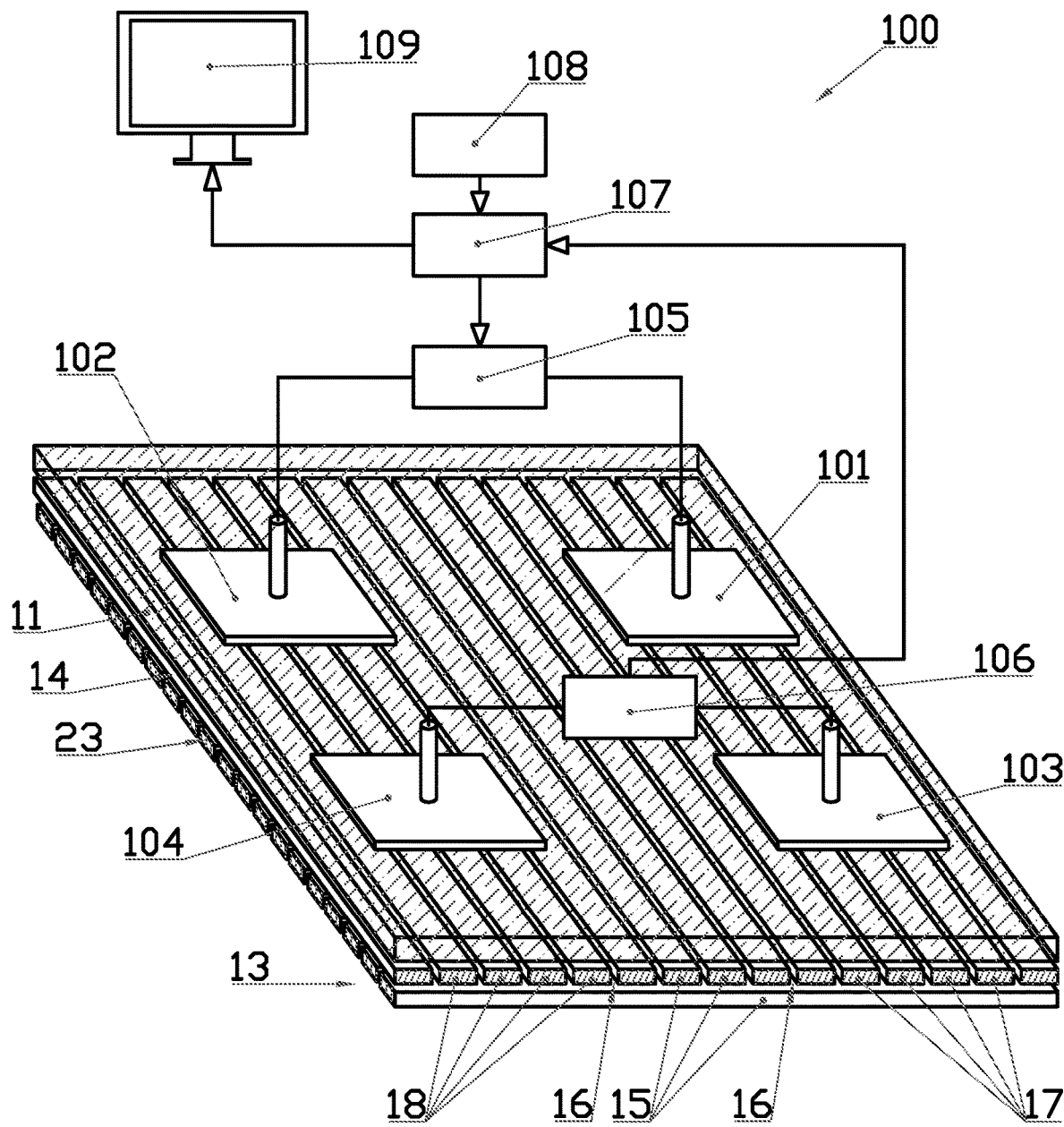
FIG. 4 is a schematic view of a first variant of a second exemplary embodiment of the nondestructive inspection device according to the invention.
Figure 5:
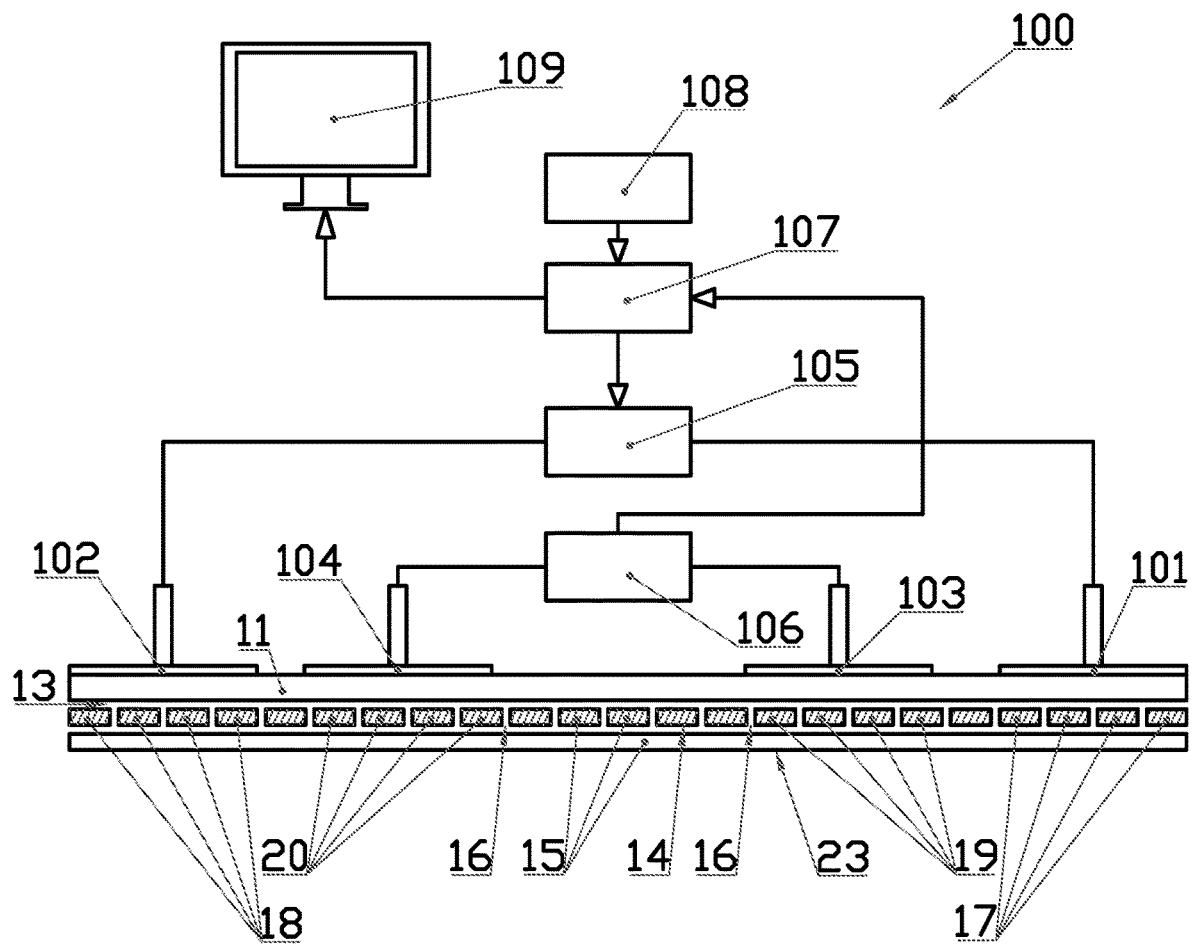
FIG. 5 is a schematic view of a second variant of the second exemplary embodiment of the nondestructive inspection device according to the invention.

For simplification purposes, the different elements of the flexible line are schematically shown flat in FIGS. 3 to 5, although in reality they are generally arranged in an arc of circle.

DETAILED DESCRIPTION OF THE INVENTION

The solution proposed by the invention is a nondestructive inspection method of a flexible line (10) and the device (100) allowing this method to be implemented.

Within the meaning of the present invention, "flexible line" refers to any flexible line used in the field of underwater oil and/or gas facilities for transporting fluids, energy or information. An underwater oil and/or gas facility generally includes one or several surface assemblies (2) and one or several bottom assemblies (3).

Figure 1:
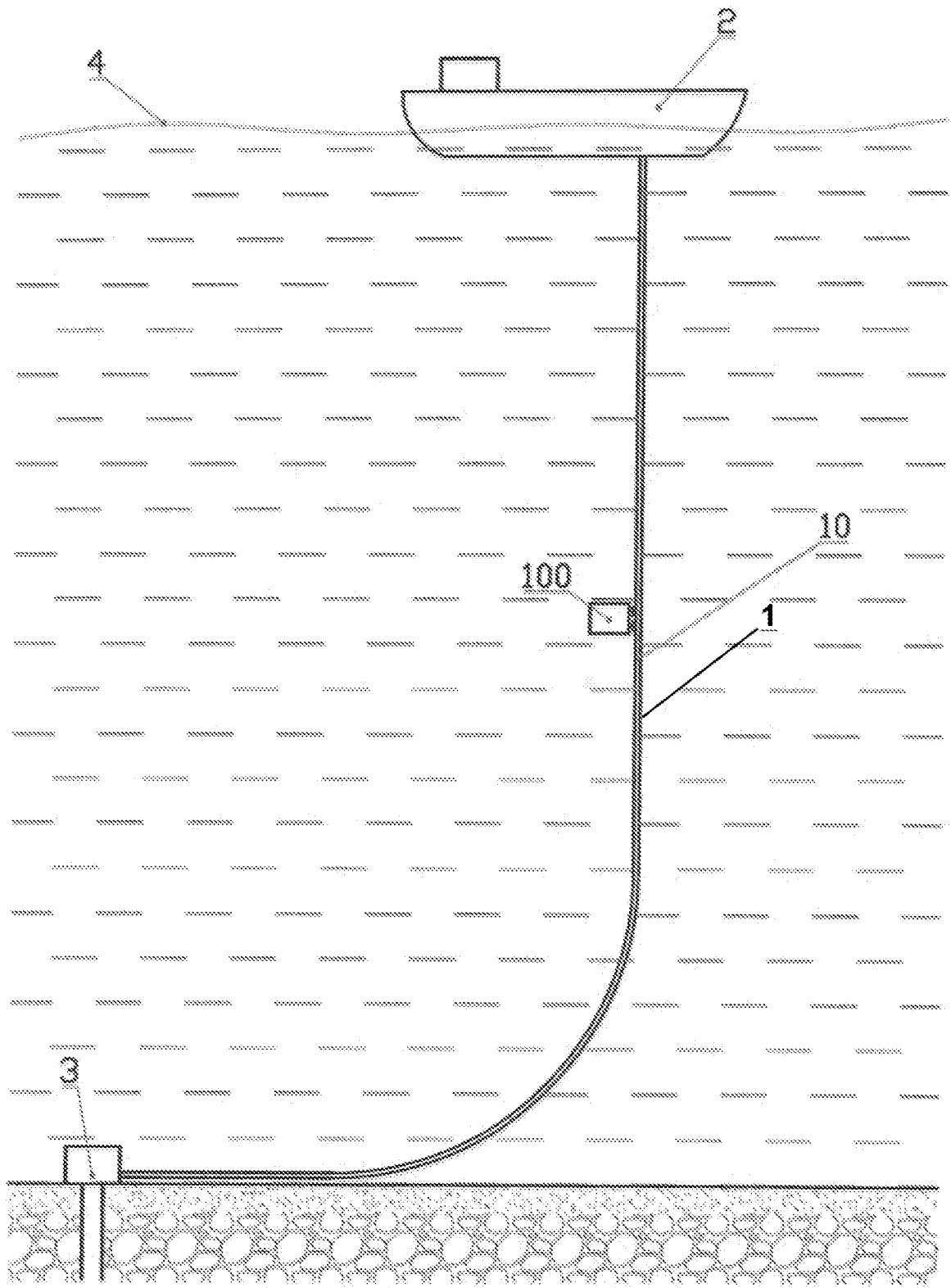
FIG. 1 is a schematic view of the nondestructive inspection device according to the invention arranged opposite a flexible line extending from a bottom assembly to a surface assembly through a body of water.

In reference to FIG. 1, a surface assembly (2) is arranged on the surface of a body of water (4). The body of water (4) is for example an ocean, sea, lake or river. The surface assembly (2) can be stationary or floating. When it is stationary, the surface assembly (2) rests on a structure of the trellis or gravitational type fastened on the bottom of the body of water. When it is floating, the surface assembly (2) is advantageously formed by a surface naval support that may for example be a Floating Production, Storage and Offloading (FPSO) unit, or a Floating Liquefied Natural Gas (FLNG) unit, a semisubmersible platform, which may for example be a Tension Leg Platform (TLP), an unloading buoy, a floating vertical column or a ship.

A bottom assembly (3) is arranged on the bottom of the body of water (4) and assumes the form of one or a set of underwater production devices of the well, wellhead (or Christmas tree or X-tree), manifold, subsea processing unit (SPU), subsea storage unit (SSU), etc. type.

The oil and/or gas facility also comprises a network of flexible and/or rigid lines (1) making it possible to connect the surface assembly or assemblies (2) and the bottom assembly or assemblies (3) to one another. These flexible or rigid lines (1) are at least partially submerged in the body of water (4). The depth of the body of water (4) at the facility is for example between 50 m and 3000 m, or even 4000 m.

Figure 2:
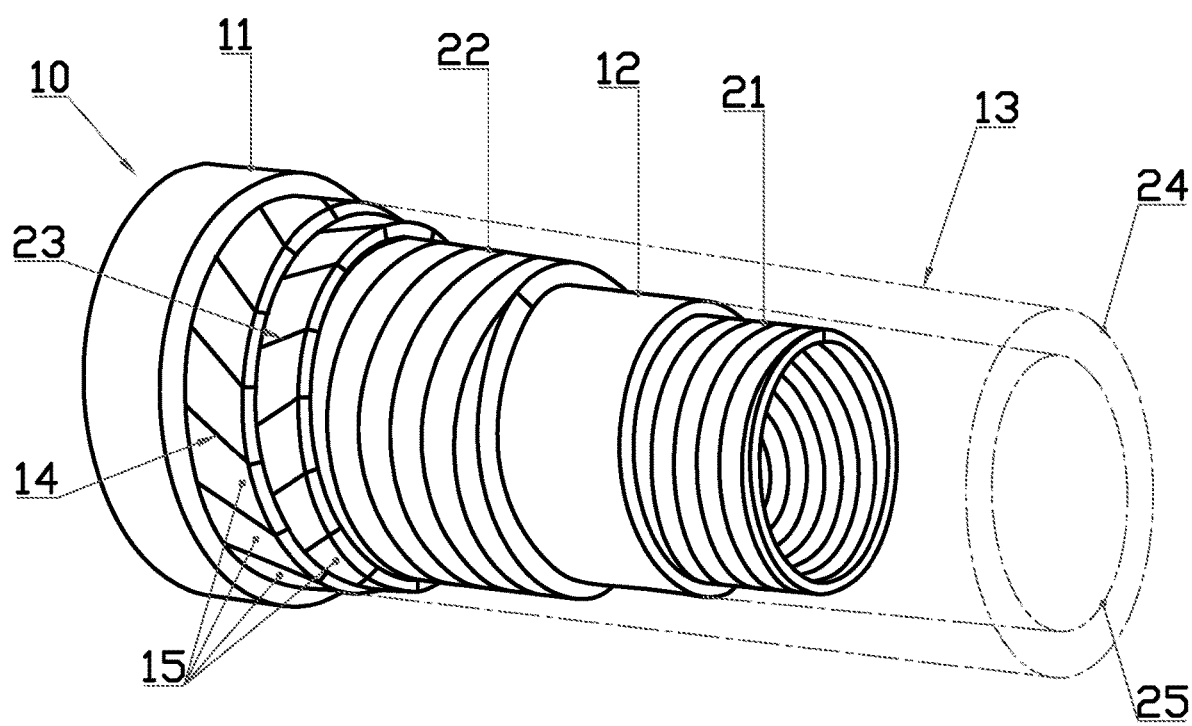
FIG. 2 is a schematic perspective view of an example flexible line that the invention proposes to inspect.

The flexible line (10) can assume the form of:

a flexible pipe, as shown in FIG. 2, of the unbonded type intended to transport hydrocarbons through the body of water (4), and for example made according to normative documents API 17 J (Specification for Unbonded Flexible Pipe) and API RP 17 B (Recommended Practice for Flexible Pipe) established by the American Petroleum Institute, or an umbilical reinforced by armors intended to transport electrical or hydraulic energy, data, or injection products, through the body of water (4), and for example made according to normative documents API 17 E (Specification for Umbilicals), or a combination of the two.

The flexible line (10) comprises at least one armor layer (14, 23). Each armor layer (14, 23) assumes the form of a juxtaposition of several armors (15), generally between 30 and 100 armors (15). The armors (15), generally called tensile armors, serve to react tensile forces exerted on the flexible line (10). The breaking limit of the armors (15) is advantageously greater than 1000 MPa. Two adjoining armors (15) can be separated by a gap (16) with a width of between 5 mm and 0.001 mm. The armors (15) are wound helically so as to form a tube. The absolute value of the helix angle of the helicoid formed by an armor (15) is less than 60°, and is typically between 25° and 55°. An armor (15) assumes the form of a wire with a rectangular, square, circular, oval, bean-shaped, T-shaped, or any other shaped section suitable for one skilled in the art.

In some configurations, the flexible line (10) can comprise a pair of armor layers (14, 23). The two armor layers (14, 23) are crossed, i.e., they have substantially opposite helix angles, so as to balance the structure of the flexible line (10) in torsion, i.e., so as to limit its tendency to rotate under the effect of a pulling force. The two armor layers (14, 23) are arranged coaxially, a first armor layer (14) being the armor layer closest to the external sheath, and the second armor layer (23) being located inside the first armor layer (14).

The armors (15) can be made from metal, advantageously carbon steel or weakly alloyed steel or stainless steel. The metal armors are generally obtained by wiredrawing, rolling, and heat treatment of metal wires. The metal armors (15) have an electrical conductivity generally of between $3 \times 10^6$ S/m and $10 \times 10^6$ S/m, preferably between $5.5 \times 10^6$ S/m and $6.5 \times 10^6$ S/m. When they are made from carbon steel or weakly alloyed steel, the metal armors (15) are magnetic and have a relative magnetic permeability generally greater than or equal to 100. However, the present invention can also apply to the case where the metal armors (15) are nonmagnetic or weakly magnetic, for example if they are made from titanium, aluminum or certain grades of austenitic stainless steel.

The armors (15) can be made from composite materials, made from a matrix and reinforcing fibers. The matrix is made with a base of a thermosetting resin, for example an epoxy resin, or a thermoplastic resin, for example a resin with a base of polyether ether ketone (PEEK), polyvinylidene fluoride (PVDF) or polyphenylene sulfide (PPS). The matrix is generally nonmagnetic and electrically insulating (practically nil electrical conductivity). The reinforcing fibers are generally oriented parallel to the axis of the armor and can be made from carbon, glass or aramid. The glass, carbon and aramid are nonmagnetic. The glass and the aramid are electrical insulators, while the carbon is conductive. The armors (15) made from a carbon fiber-based composite material have an electrical conductivity generally of between $10 \times 10^3$ S/m and $50 \times 10^3$ S/m. The armors (15) generally have a width that can vary from 10 mm to 30 mm and a thickness that can vary from 0.5 mm to 10 mm.

The at least one armor layer (14, 23) is arranged inside an annular space (13). Within the meaning of the invention, "annular space" refers to a space delimited by two fictitious cylinders (24, 25) with different radii arranged coaxially. The thickness of the annular space (13), corresponding to the difference in the radii of the two fictitious cylinders, is generally between 5 mm and 60 mm, or even more. The annular space (13) comprises a fluid. This fluid is generally a gas when the flexible line (10) is intact and a liquid when the flexible sheath has been damaged.

At the sole armor layer (14), or when the flexible line (10) comprises several armor layers (14, 23) of the armor layer (14) closest to the external sheath (11), the latter being described in more detail in the remainder of the description, and for the needs of the nondestructive inspection method, it is possible to identify several groups of armors (17, 18, 19, 20) comprising from 2 to 6 armors (15), or even more. Thus, the armor layer (14) closest to the external sheath (11) can comprise at least a first group of armors (17) and a second group of armors (18) that are separate from one another. The armor layer (14) closest to the external sheath (11) can also comprise at least a third group of armors (19) and a fourth group of armors (20) that are separate from one another and separate from the first group of armors (17) and the second group of armors (18). The third group of armors (19) and the fourth group of armors (20) are preferably arranged between the first group of armors (17) and the second group of armors (18).

The flexible line (10) comprises at least one external sheath (11). The external sheath (11) is arranged so as to surround said annular space (13). Within the meaning of the present invention, "surround" refers to the fact that the annular space (13) fits in a cylinder formed by the external sheath (11), the latter being able to be, or not, attached to said annular space (13). Indeed, in certain embodiments, the flexible line (10) can comprise one or several intermediate sheaths inserted between the external sheath (11) and the annular space (13). The external sheath (11) assumes the form of a flexible tube with a circular section, optionally oval. The external sheath (11) is made from polymer, for example polyamide, polyethylene or elastomeric thermoplastic polymer. The external sheath (11) generally has a thickness able to vary from 2 mm to 20 mm. The external sheath (11) is generally obtained by extrusion. The external sheath (11) is nonmagnetic and electrically insulating (practically nil electrical conductivity).

In practice, and as shown schematically in FIG. 2, when the flexible line (10) is a flexible pipe, it can comprise, from the inside toward the outside:
an inner carcass (21),
an internal sheath (12), also called pressure sheath,
a pressure arch (22),
one or several armor layers (14, 23),
one or several intermediate sheaths (not shown),
and the external sheath (11).

The internal carcass (21) is made up of a profiled stainless steel metal strip wound with a short pitch in order to form turns that are stapled to one another. The main function of the internal carcass (21) is to react radial crushing forces, for example those related to the hydrostatic pressure or those exerted by external equipment, in particular during the installation of the flexible pipe at sea. A flexible pipe comprising an internal carcass (21) is said to have a "rough bore" due to the geometry of said internal carcass.

However, the present invention could also apply to a flexible pipe not having an internal carcass, such a pipe being said to have a "smooth bore", since its first layer starting from the inside is the internal sheath (12), the latter being in the form of a tube having a smooth inner wall.

The internal sheath (12) assumes the form of a flexible tube with a circular section, optionally oval. The internal sheath (12) serves to confine the hydrocarbon circulating inside the flexible pipe, the internal carcass (21) not being tight. The polymeric material forming the internal sheath (12) is chosen in particular based on the chemical composition, the temperature and the pressure of the hydrocarbon that the flexible pipe must transport. The polymers most commonly used to produce the internal sheath (12) are polyamides, cross-linked polyethylene and vinylidene fluoride-based fluorinated polymers, and in particular those with a base of polyvinylidene fluoride (PVDF). The internal sheath (12) generally has a thickness able to vary from 2 mm to 20 mm. The internal sheath (12) is generally obtained by extrusion. The external sheath (11) and the internal sheath (12) are generally arranged coaxially. Within the meaning of the present invention, "coaxially" refers to the fact that two tubular elements are coaxial to within any manufacturing flaws, i.e., these two tubular elements are considered to be coaxial even if a deviation smaller than 10 mm exists between their axes. The external sheath (11) and the internal sheath (12) then define an annular space (13) between them.

The pressure arch (22) is made up of one or several metal wires having a cross-section in the shape of a Z, T, C, X or K, said wire(s) being wound helically with a short pitch, i.e., with a helix angle close to 90°, and stapled to one another. The main function of the pressure arch (22) is to react the radial forces related to the pressure of the hydrocarbon circulating in the pipe, the internal sheath (12) not being capable by itself of withstanding a high pressure and therefore having to be supported by said pressure arch (22).

The device (100) for the nondestructive inspection of the flexible line (10) is intended to be at least partially submerged in the body of water (4) in order to inspect said flexible line (10).

As shown schematically in FIGS. 3 to 5, the device (100) for the nondestructive inspection of the flexible line (10) comprises an electromagnetic field generator configured to generate an electromagnetic field extending through at least part of the annular space (13). Thus, an assembly formed by armors (15) and fluid is subject to said electromagnetic field.

The electromagnetic field generator can comprise at least one pair of electrodes (101, 102, 103, 104). Thus, the electromagnetic field generator can comprise a single pair of electrodes (101, 102), or two pairs of electrodes (101, 102, 103, 104) or more than two pairs of electrodes. The electrodes (101, 102, 103, 104) are intended to be arranged in the vicinity of the external sheath (11) of the flexible line (10). "Vicinity" refers to the fact that the distance separating the electrodes (101, 102, 103, 104) of the external sheath (11) is at least smaller than the radius of the flexible line (10). Advantageously, the distance separating the electrodes (101, 102, 103, 104) of the external sheath (11) is smaller than 100 mm, preferably smaller than 20 mm. According to one preferred embodiment, the electrodes (101, 102, 103, 104) are intended to be arranged in contact with the external sheath (11). Within the meaning of the invention, "in contact" means that at least one point of contact exists between the electrodes (101, 102, 103, 104) and the external sheath (11). The electrodes (101, 102, 103, 104) are thus intended to be submerged in the body of water (4) in order to inspect the flexible line (10).

Each electrode (101, 102, 103, 104) can comprise a conductive body. Advantageously, the conductive body of one, several, or all of the electrodes (101, 102, 103, 104) can be made from metal, preferably from copper, silver or gold. The conductive body of each of the electrodes (101, 102, 103, 104) can have a circular, hexagonal, rectangular, square, diamond, or any other shape suitable for one skilled in the art, and preferably with dimensions of between 20 mm and 250 mm. The conductive body of the electrodes (101, 102, 103, 104) advantageously has a parallelepiped shape with a rectangular base, the length and width of which are between 20 mm and 250 mm, preferably with a square base with sides equal to 70 mm. The conductive body of each electrode (101, 102, 103, 104) has a thickness generally of between 0.1 mm and 5 mm. The conductive body of each electrode (101, 102, 103, 104) can comprise a front face intended to be opposite the flexible line (10) to be inspected. Each electrode (101, 102, 103, 104) can comprise a corrosion protection coating arranged on the front face of the conductive body of said electrode (101, 102, 103, 104). This corrosion protection coating can be made with an electrically insulating and non-magnetic coating, such as a polymeric material. This corrosion protection coating can have a thickness of between 1 mm and 5 mm. Alternatively, or in addition to the corrosion protection coating, each electrode (101, 102, 103, 104) can comprise an elastomeric coating configured to drive out the water between the electrode and the external sheath (11) of the flexible line (10) when said electrode comes into contact with said external sheath. The elastomeric coating can have a thickness of between 1 mm and 5 mm. The conductive body of each electrode (101, 102, 103, 104) can also comprise a rear face opposite the front face. The conductive body of each electrode (101, 102, 103, 104) can lastly comprise one or several side faces joining the front face to the rear face. Advantageously, the electrodes (101, 102, 103, 104) of the or each of the pairs of electrodes are separated by a fixed distance, in particular during the measurement. In particular, the distance separating the electrodes (101, 102, 103, 104) of the or each of the pairs of electrodes can be between 200 mm and 500 mm. The electrodes (101, 102, 103, 104) can be mounted on a remotely operated vehicle (ROV) so as to be able to operate the device (100) remotely for the nondestructive inspection of the flexible line (10) within the body of water. The electrodes can also be mounted on a gripping collar, in particular inside pads of said gripping collar, or on any other hooking and/or movement means on a flexible line (10) known by one skilled in the art.

Each electrode (101, 102, 103, 104) can comprise an electrical insulation means with the surrounding environment, in particular the water from the body of water (4), so as to avoid the creation of a ground loop of the electromagnetic field between said electrodes (101, 102, 103, 104), by the rear face of their conductive bodies, through the water of the body of water. In particular, the electrical insulation means can assume the form of an electrically insulating coating arranged on the rear face and the side face(s) of the conductive body of the electrode (101, 102, 103, 104). "Electrically insulating" refers to the fact that the material used has a resistivity greater than $10^9$ Ω·m. This electrically insulating coating can be made from resin or syntactic foam. The coating generally has a thickness of between 10 mm and 30 mm, or even more. The insulating means can also assume the form of a bell surrounding the rear face and the part(s) across from the electrode (101, 102, 103, 104). The bell can be made from resin, or from syntactic foam. The bell generally has a thickness of between 20 mm and 30 mm, or even more.

The electromagnetic field generator can also comprise a voltage generator (105) or alternatively a current generator. The voltage, respectively current, generator (105) is configured to supply a variable voltage, or a variable current. The variable voltage, respectively variable current, is in particular of the alternating, sinusoidal, square, triangular or pulsed type.

When the electromagnetic field generator comprises a single pair of electrodes (101, 102), the voltage generator (105) is configured to supply alternating voltage of a determined frequency to said pair of electrodes (101, 102) so as to generate an electromagnetic field extending across at least part of the annular space (13) of said flexible line (10). Thus, an assembly formed by armors (15) and fluid is subject to said electromagnetic field. Alternatively, the current generator (105) is configured to supply alternating current of a determined frequency to said pair of electrodes (101, 102) so as to generate an electromagnetic field extending across at least part of the annular space (13) of said flexible line (10). Thus, an assembly formed by armors (15) and fluid is subject to said electromagnetic field. Also alternatively, the voltage generator (105) is configured to supply pulsed voltage to said pair of electrodes (101, 102) so as to generate an electromagnetic field extending across at least part of the annular space (13) of said flexible line (10). Thus, an assembly formed by armors (15) and fluid is subject to said electromagnetic field. Also alternatively, the current generator (105) is configured to supply pulsed current to said pair of electrodes (101, 102) so as to generate an electromagnetic field extending across at least part of the annular space (13) of said flexible line (10). Thus, an assembly formed by armors (15) and fluid is subject to said electromagnetic field.

When the electromagnetic field generator comprises several pairs of electrodes (101, 102, 103, 104), the voltage generator (105) is configured to supply alternating voltage of a determined frequency to the first pair of electrodes (101, 102) so as to generate an electromagnetic field extending across at least part of the annular space (13) of said flexible line (10). Thus, an assembly formed by armors (15) and fluid is subject to said electromagnetic field. Alternatively, the current generator (105) is configured to supply alternating current of a determined frequency to the first pair of electrodes (101, 102) so as to generate an electromagnetic field extending across at least part of the annular space (13) of said flexible line (10). Thus, an assembly formed by armors (15) and fluid is subject to said electromagnetic field. Also alternatively, the voltage generator (105) is configured to supply pulsed voltage to the first pair of electrodes (101, 102) so as to generate an electromagnetic field extending across at least part of the annular space (13) of said flexible line (10). Thus, an assembly formed by armors (15) and fluid is subject to said electromagnetic field. Also alternatively, the current generator (105) is configured to supply pulsed current to the first pair of electrodes (101, 102) so as to generate an electromagnetic field extending across at least part of the annular space (13) of said flexible line (10). Thus, an assembly formed by armors (15) and fluid is subject to said electromagnetic field.

To that end, the voltage, or alternatively current, generator (105) can comprise electrical connecting means to the electrodes (101, 102, 103, 104) to be supplied with voltage, or alternatively with current, or with pulsed voltage, or with pulsed current. Each connecting means can assume the form of an electrical cable whereof one of the ends is welded on the electrode (101, 102, 103, 104), or equipped with an electrical connector cooperating with a corresponding electrical connector arranged on the electrode (101, 102, 103, 104). To that end, the voltage, alternatively current, generator (105) can be submerged and arranged in a tight box near the pair(s) of electrodes (101, 102, 103, 104) or in large part offset toward the surface assembly (2) or a boat, only the connecting means extending from said surface assembly (2) or said boat toward the electrodes (101, 102, 103, 104) being at least partially submerged. The voltage generator (105) is configured to supply alternating voltage, or alternating current, with a determined frequency between 10 Hz and 10 MHz, advantageously between 100 kHz and 3 MHz, preferably between 200 kHz and 800 kHz. The voltage generator (105) is configured to deliver an alternating voltage with an amplitude of between 1 mV and 10 V, preferably between 100 mV and 1 V.

The device (100) for the nondestructive inspection of a flexible line (10) also comprises a measuring instrument (106).

When the electromagnetic field generator comprises a single pair of electrodes (101, 102), the measuring instrument is configured to measure, at said pair of electrodes (101, 102), an electrical signal related to the electromagnetic characteristics of said at least one part of the annular space (13) subject to said generated electromagnetic field.

When the electromagnetic field generator comprises several pairs of electrodes (101, 102, 103, 104), the measuring instrument is configured to measure, at a second pair of electrodes (103, 104), the electromagnetic characteristics of said at least one part of the annular space (13) subject to said generated electromagnetic field.

To that end, the measuring instrument (106) can comprise electrical connecting means to said electrodes (101, 102, 103, 104) on which the measurement must be done. In particular, the measured electrical signal can be a complex signal, the modulus of said complex signal is equal to the amplitude of the voltage measured across the terminals of the second pair of electrodes (103, 104), and the phase of said complex signal being equal to the phase shift measured between the voltage across the terminals of the second pair of electrodes (103, 104) on the one hand, and the voltage or the current supplying the first pair of electrodes (101, 102) on the other hand. Each connecting means can assume the form of an electrical cable whereof one of the ends is welded on the electrode (101, 102, 103, 104), or equipped with an electrical connector cooperating with a corresponding electrical connector arranged on the electrode (101, 102, 103, 104). To that end, the measuring instrument (106) can be submerged and arranged in a tight box near the pair(s) of electrodes (101, 102, 103, 104) or in large part offset toward the surface assembly (2) or a boat, only the connecting means extending from said surface assembly (2) or said boat toward the electrodes (101, 102, 103, 104) being at least partially submerged.

The electrical signal related to the electromagnetic characteristics can be the voltage and/or the intensity and/or an impedance and/or any other electrical property suitable for one skilled in the art. The measuring instrument (106) can comprise a voltmeter and/or an ammeter. In particular, the measuring instrument (106) can be an inductometer, combination of a voltmeter and an ammeter, which, by the voltage to intensity ratio, makes it possible to determine the impedance of an electrical circuit. The measuring instrument (106) is advantageously a vector network analyzer.

The device (100) for the nondestructive inspection of the flexible line (10) also comprises an analyzer configured to process the electrical signal related to the measured electromagnetic characteristics so as to determine the nature of the fluid contained in the annular space (13) of said flexible line (10). This analyzer can assume the form of a comparator (107) configured to compare the electrical signal related to the measured electromagnetic characteristics with reference values so as to determine the nature of the fluid contained in the annular space (13) of said flexible line (10). The comparator (107) can assume the form of a microprocessor executing part of a computer program stored in a memory (108) and configured to determine, from the measurement of the input electrical signal and reference values stored in said memory (108), the nature of the fluid contained in the annular space (13). "Nature of the fluid" refers to the fact that the fluid is a gas or a liquid. When the annular space (13) contains at least one liquid phase, the comparator (107) can also be configured to compare the measured electrical signal with reference values so as to determine the nature of the liquid phase(s) contained in the annular space (13). "Nature of the liquid phase(s)" refers to the fact that the liquid is water and/or saltwater and/or oil and/or any other liquid able to have flooded the annular space (13). The comparator (107) is connected to the measuring instrument (106) using an electronic circuit and/or electrical or optical data cables and/or wireless communication members and/or any other connection means suitable for one skilled in the art.

The device (100) for the nondestructive inspection of the flexible line (10) can also comprise one or several information means (109) connected to the comparator and configured to notify an operator of the nature of the fluid or of the liquid phase(s). This information means (109) can comprise a sound member configured to emit a specific sound when the annular space contains at least one liquid phase or conversely only a gaseous phase. The sound member can also be configured to emit a first sound when the annular space (13) contains at least one liquid phase and a second sound, different from the first sound, when said annular space (13) contains only a gaseous phase, or a different sound for each type of liquid phase. In particular, the sound member can comprise one or several speakers. This information means (109) can, alternatively or in combination, comprise a light member configured to emit a light signal when the annular space contains at least one liquid phase or conversely only a gaseous phase. The light member can also be configured to emit a first light signal when the annular space (13) contains at least one liquid phase and a second light signal, different from the first light signal, when said annular space (13) contains only a gaseous phase, or a different light signal for each type of liquid phase. In particular, the light member can comprise one or several lighted indicators of the light-emitting diode (LED) type. This information means (109) can, alternatively or in combination, comprise a display screen making it possible to display messages relative to the nature of the liquid contained in the annular space of the flexible line. The information means (109) is or are generally arranged on the surface assembly (2) or a boat. The information means (109) is or are connected to the comparator (107) using an electronic circuit and/or electrical or optical data cables and/or wireless communication members and/or any other connection means suitable for one skilled in the art.

The method for the nondestructive inspection of a flexible line (10) according to the invention is remarkable in that it comprises the following steps:

a) arranging at least one pair of electrodes (101, 102, 103, 104) in the vicinity of the external sheath (11), b) supplying alternating voltage of determined frequency, or alternating current of determined frequency, or pulsed voltage, or pulsed current, to said pair of electrodes (101, 102), or to a first pair of electrodes (101, 102) of said pairs of electrodes (101, 102, 103, 104), so as to generate an electromagnetic field extending through at least part of the annular space (13), and thus to subject an assembly formed by armors (15) and the fluid to said electromagnetic field, c) measuring, at said pair of electrodes (101, 102), or at a second pair of electrodes (103, 104) of said pairs of electrodes (101, 102, 103, 104), an electrical signal related to the electromagnetic characteristics of said at least one part of the annular space (13) subject to said generated electromagnetic field, d) processing said electrical signal so as to determine the nature of the fluid contained in the annular space (13).

In general, the processing of the signal consists of comparing said electrical signal with the reference values so as to determine the nature of the fluid contained in the annular space (13). Preferably, when the measured electrical signal is a complex signal, the processing of the signal consists of comparing the modulus and/or the phase of said complex with reference values so as to determine the nature of the fluid contained in the annular space (13).

Under the effect of the electromagnetic field, the assembly formed by the juxtaposition of two conductive armors (15) separated by a gap (16) comprising a dielectric fluid that is significantly less conductive than the armors (15) will behave like a capacitor whose electric capacitance in particular depends on the dielectric permittivity of the fluid. Thus, the part located between the electrodes (101, 102, 103, 104) is then comparable to a network of capacitors in series. Knowing the actual average size of the gaps (16), it is possible to calculate, theoretically, knowing the electric conductivity of the armors (15) and the fluid, the theoretical value of the electric capacitance as a function of the nature of the fluid. These calculated theoretical values can then be stored as reference values in the memory (108) of the device (100). Thus, by comparing the theoretical value of the electric capacitance to the measurement of the total electric capacitance between the electrodes (101, 102, 103, 104) at which the measurement is done, it is possible to determine which theoretical value the measured value is closest to, and thus to determine the nature of the fluid contained in the annular space (13) of the flexible line (10).

In reference to FIG. 3, and according to a first exemplary embodiment, during step a), a single pair of electrodes (101, 102) is arranged near the external sheath (11). In an embodiment with a single electrode pair (101, 102), it is first possible to arrange the two electrodes (101, 102) of the pair aligned along a same group of armors. However, the measurable difference in electric capacitance between different configurations of fluid contained in the annular space (13) is small, generally around $1/10^e$, and it is thus difficult to effectively determine the nature of the fluid contained in said annular space (13) in light of the risks of interference with the measurement under real conditions, in particular due to imperfect positioning of said electrodes (101, 102) relative to the external sheath (11) and/or the armors (15). Thus, in order to obtain more precise measurements and an improved exploitation of the results, it is preferable for step a) to comprise the following steps:

a1) arranging a first electrode (101) from the sole pair of electrodes (101, 102) opposite the first group of armors (17), a2) arranging a second electrode (102) from the sole pair of electrodes (101, 102) opposite the second group of armors (18).

In a configuration with a sole pair of electrodes (101, 102), the measurement done in step c) is then done at the same pair of electrodes (101, 102) across the terminals of which the current is delivered in step b).

In reference to FIGS. 4 and 5, according to a second exemplary embodiment of step a), the latter can comprise step a3) consisting of arranging, near the external sheath (11), two pairs of electrodes (101, 102, 103, 104). Similarly to the first exemplary embodiment of step a), it is preferable to avoid a configuration in which the electrodes (101, 102, 103, 104) are aligned along a same group of armors. Thus, in order to obtain more precise measurements and an improved exploitation of the results, it is preferable for step a) to comprise the following steps:

a3) arranging a first electrode (101) from the first pair of electrodes (101, 102) opposite the first group of armors (17), a4) arranging a second electrode (102) from the first pair of electrodes (101, 102) opposite the second group of armors (18).

As shown in FIG. 4, in a first variant of the second exemplary embodiment of step a), the latter can comprise the following steps:

a5) arranging a first electrode (103) from the second pair of electrodes (103, 104) opposite the first group of armors (17), a6) arranging a second electrode (104) from the second pair of electrodes (103, 104) opposite the second group of armors (18).

Figure 6:
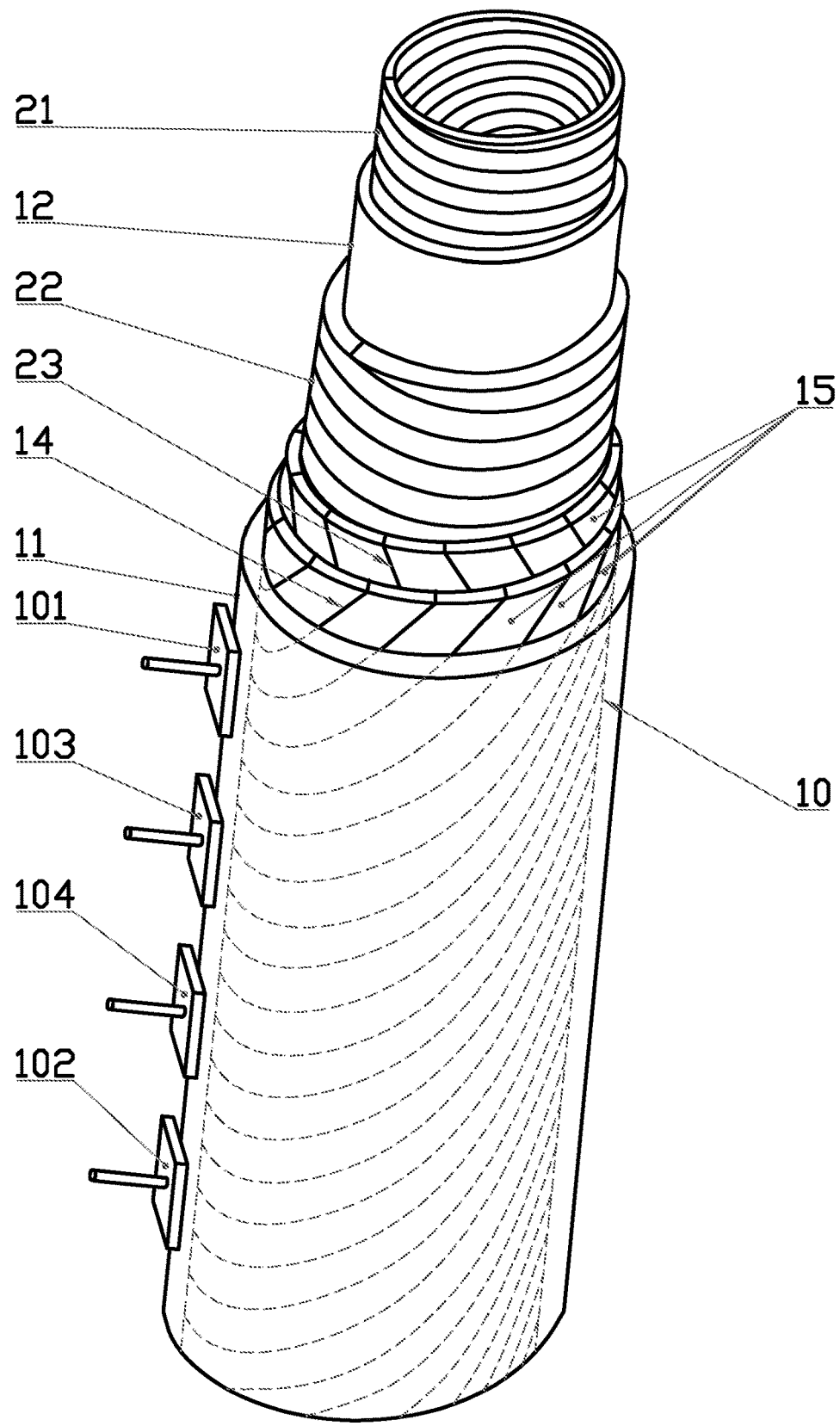
FIG. 6 is a schematic perspective view of the second variant shown in FIG. 5.

As shown in FIGS. 5 and 6, in a second variant of the second exemplary embodiment of step a), the latter can comprise the following steps:

a7) arranging a first electrode (103) from the second pair of electrodes (103, 104) opposite the third group of armors (19), a8) arranging a second electrode (104) from the second pair of electrodes (103, 104) opposite the fourth group of armors (20).

In a configuration with two pairs of electrodes (101, 102, 103, 104), the measurement done in step c) is then done at a second pair of electrodes (103, 104) different from the first pair of electrodes (101, 102) supplied with alternating voltage, or alternating current, or pulsed voltage, or pulsed current.

Other variants with more than two pairs of electrodes could also be imagined by one skilled in the art without distorting the very essence of the invention.

In practice, irrespective of the embodiment example or variant chosen for the number of electrode pairs (101, 102, 103, 104), and as previously mentioned, each group of armors (17, 18, 19, 20) can comprise between 2 and 6 armors, optionally more. In order to obtain measurements and an optimal exploitation of the results, it is preferable for the sum of the widths of the armors (15) from the armor group (17, 18, 19, 20) to be at least equal to the width of the electrode (101, 102, 103, 104) that is arranged opposite.

In practice, and irrespective of the embodiment example or variant chosen for the number of electrode pairs (101, 102, 103, 104), in order to obtain a usable measurement, it is sufficient for the electrodes (101, 102, 103, 104) to be arranged near the external sheath (11) of the flexible line (10), i.e., at a distance at least smaller than the radius of said flexible line (10). The precision of the measurement and the use of the results improve as long as the electrodes (101, 102, 103, 104) are close to the external sheath (11). Advantageously, the distance separating the electrodes (101, 102, 103, 104) of the external sheath (11) is smaller than 100 mm, preferably smaller than 20 mm. In one optimal arrangement, step a) can comprise step a9) consisting of arranging the electrodes (101, 102, 103, 104) of at least one pair of electrodes (101, 102, 103, 104) in contact with the external sheath (11).

Still with the aim of optimizing the method, step b) can comprise step b1) consisting of supplying alternating voltage, or alternating current, with a determined frequency between 10 Hz and 10 MHz, advantageously between 100 kHz and 3 MHz, preferably between 200 kHz and 800 kHz. The selection of these frequency ranges makes it possible to ensure better penetration of the electromagnetic field through the external sheath (11) and the annular space (13). Furthermore, the selection of this frequency range indeed makes it possible to distinguish between the first case where the fluid is air (dry annular space), the second case where the fluid is freshwater having slowly diffused through the internal sheath (annular space flooded by diffusion from the inside of the pipe), and the third case where the fluid is saltwater (annular space flooded by seawater probably due to a loss of seal of the external sheath). The distinction between air and freshwater is based primarily on the difference between the dielectric permittivity of air and water, the difference in particular being related to the significant polarity of water molecules. The distinction between freshwater and saltwater is in turn based primarily on the difference in electric conductivity. The selection of the aforementioned frequency range makes it possible to best use these differences in electromagnetic properties simply and reliably.

Step b) can also comprise one or several additional steps, carried out simultaneously or sequentially, and consisting of supplying alternating voltage, or alternating currency, of determined frequency separate from the other determined frequencies of step b) or said additional steps. This is then called frequency scanning. In practice, when frequency scanning is done, the group of steps b), c) and d) is carried out several times, simultaneously or sequentially, with a different determined frequency for each execution. Taking several different measurements by varying the determined frequency of the supply of alternative voltage or alternating current makes it possible to improve the determination of the fluid contained in the annular space (13).

As previously mentioned, and in light of the behavior of the assembly formed by the armors (15) and the fluid contained in the annular space (13), when said assembly is subjected to an electromagnetic field, the signal connected to the electromagnetic characteristics of the annular space that it may be of interest to measure is the electric capacitance between the armor wires. However, it may prove complex to take a direct measurement thereof. Thus, it may prove wise to go through the measurement of other electric signals making it possible next to obtain, through calculation, the value of the electric capacitance through standard physical models and theories. In another manner, it is also possible, knowing the theoretical electric capacitance, to deduce other theoretical electrical characteristics, such as the theoretical voltage, the theoretical intensity, the theoretical impedance or the theoretical transmittance, and to take these theoretical values as reference values in order to compare them directly to the measured electrical signal, namely the measured voltage, the measured intensity, the measured impedance or the measured transmittance. Alternatively or additionally, the reference values can also be obtained by measurements done in the laboratory on specimens of flexible line (10). Examples of reference value curves obtained in the laboratory are shown in FIGS. 7 to 10. Thus, step c) can comprise a step consisting of measuring the voltage across the terminals of the sole pair of electrodes (101, 102) or the second pair of electrodes (103, 104) and/or a step consisting of measuring the intensity that circulates through the electrodes of said sole pair of electrodes (101, 102) or said second pair of electrodes (103, 104). Alternatively or in combination, step c) can also comprise step c1) consisting of measuring the impedance across the terminals of the sole pair of electrodes (101, 102), or the transmittance between the first pair of electrodes (101, 102) and the second pair of electrodes (103, 104). The impedance and the transmittance are complex signals. In the case where the impedance is measured, step d) can comprise step d1) consisting of comparing the impedance measured across the terminals of the sole electrode pair (101, 102) with a reference impedance across the terminals of the sole electrode pair (101, 102) so as to determine the nature of the fluid contained in the annular space (13) of the flexible line (10). In the case where the transmittance is measured, step d) can comprise step d1) consisting of comparing transmittance between the first electrode pair (101, 102) and the second electrode pair (103, 104), with a reference transmittance between the first electrode pair (101, 102) and the second electrode pair (103, 104), so as to determine the nature of the fluid contained in the annular space (13) of the flexible line (10). In practice, the comparator compares the modulus and/or the phase and/or the imaginary part and/or the real part of the measured electrical signal with reference values so as to determine the nature of the fluid contained in the annular space (13).

When frequency scanning is done in step b), and when the electrical signal measured for each determined frequency is a complex signal of the complex impedance type or of the complex transmittance type, the measured complex signals can be shown and processed in different ways illustrated by FIGS. 7 to 10.

Figure 7:
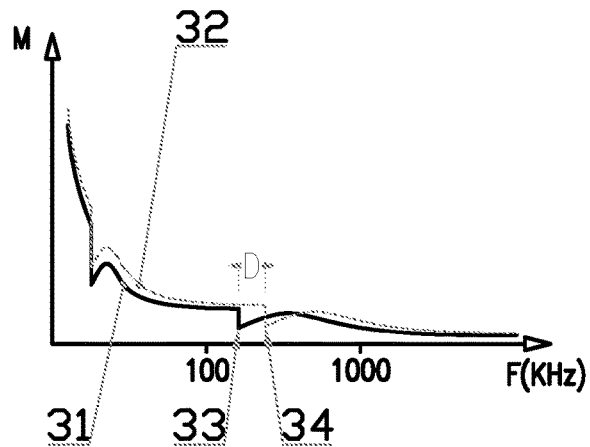
FIG. 7 schematically shows:
  in broken lines, the curve of the reference values of the modulus (M) of the complex signal as a function of the determined frequency (F), corresponding to the case where the annular space of the flexible line contains a gas, and
  in solid lines, the curve of the modulus (M) of the complex signals measured as a function of the determined frequency (F), when the annular space of the flexible line contains a liquid, and
  the frequency shift (D) between the two curves.

In reference to FIG. 7, the curve (31) in solid lines shows the modulus (M) of the complex signals measured as a function of the frequency (F), in the case where the annular space (13) of the flexible line is completely flooded with water. The curve (32) in broken lines shows the reference values of the modulus (M) of the complex signal as a function of the determined frequency (F), corresponding to the case where the annular space of the flexible line contains a gas. The curve (32) of the reference values of the modulus (M) is in particular determined during a calibration of the inspection device that is done on a flexible line segment whereof the annular space is dry and filled only with gas, typically filled with air. The comparison of the curve (31) of the modulus (M) of the complex signals measured during an inspection of the flexible line whereof the annular space is filled with a fluid of an unknown nature with the curve (32) of the reference values of the modulus (M) corresponding to an annular space filled with gas makes it possible to determine the nature of the fluid present in this annular space, and it in particular makes it possible to determine whether this fluid is a gas or freshwater or seawater.

Figure 8:
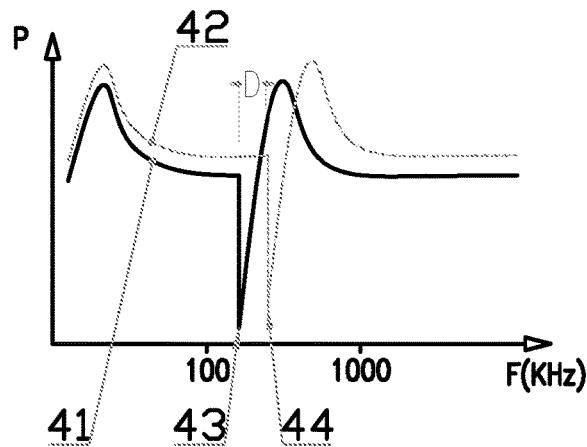
FIG. 8 schematically shows:
  in broken lines, the curve of the reference values of the phase (P) of the complex signal as a function of the determined frequency (F), corresponding to the case where the annular space of the flexible line contains a gas, and
  in solid lines, the curve of the phase (P) of the complex signals measured as a function of the determined frequency (F), when the annular space of the flexible line contains a liquid, and
  the frequency shift (D) between the two curves.

In reference to FIG. 8, the curve (41) in solid lines shows the phase (P) of the complex signals measured as a function of the frequency (F), in the case where the annular space (13) of the flexible line is completely flooded with water. The curve (42) in broken lines shows the reference values of the phase (P) of the complex signal as a function of the determined frequency (F), corresponding to the case where the annular space of the flexible line contains a gas. The curve (42) of the reference values of the phase (P) is in particular determined during a calibration of the inspection device that is done on a flexible line segment whereof the annular space is dry and filled only with gas, typically filled with air. The comparison of the curve (41) of the phase (P) of the complex signals measured during an inspection of the flexible line whereof the annular space is filled with a fluid of an unknown nature with the curve (42) of the reference values of the phase (P) corresponding to an annular space filled with gas makes it possible to determine the nature of the fluid present in this annular space, and it in particular makes it possible to determine whether this fluid is a gas or freshwater or seawater.

The curves representing the modulus (M) and the phase (P) of the complex signals as a function of the frequency (F) are advantageously used together during step d) for comparison with reference values.

Figure 9:
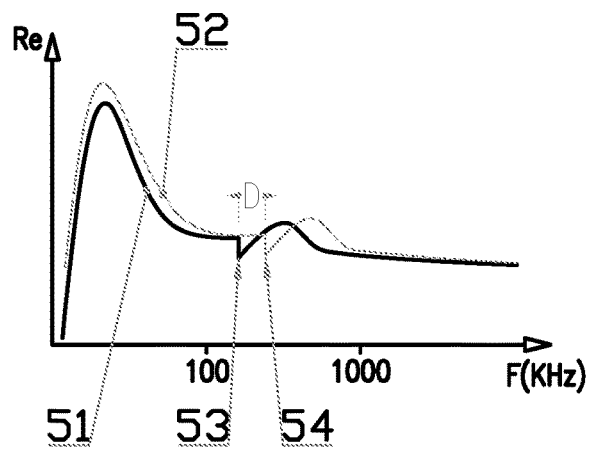
FIG. 9 schematically shows.

In reference to FIG. 9, the curve (51) in solid lines shows the real part (Re) of the complex signals measured as a function of the frequency (F), in the case where the annular space (13) of the flexible line is completely flooded with water. The curve (52) in broken lines shows the reference values of the real part (Re) of the complex signal as a function of the determined frequency (F), corresponding to the case where the annular space of the flexible line contains a gas. The curve (52) of the reference values of the real part (Re) is in particular determined during a calibration of the inspection device that is done on a flexible line segment whereof the annular space is dry and filled only with gas, typically filled with air. The comparison of the curve (51) of the real part (Re) of the complex signals measured during an inspection of the flexible line whereof the annular space is filled with a fluid of an unknown nature with the curve (52) of the reference values of the real part (Re) corresponding to an annular space filled with gas makes it possible to determine the nature of the fluid present in this annular space, and it in particular makes it possible to determine whether this fluid is a gas or freshwater or seawater.

In reference to FIG. 10, the curve (61) in solid lines shows the imaginary part (Im) of the complex signals measured as a function of the frequency (F), in the case where the annular space (13) of the flexible line is completely flooded with water. The curve (62) in broken lines shows the reference values of the imaginary part (Im) of the complex signal as a function of the determined frequency (F), corresponding to the case where the annular space of the flexible line contains a gas. The curve (62) of the reference values of the imaginary part (Im) is in particular determined during a calibration of the inspection device that is done on a flexible line segment whereof the annular space is dry and filled only with gas, typically filled with air. The comparison of the curve (61) of the imaginary part (Im) of the complex signals measured during an inspection of the flexible line whereof the annular space is filled with a fluid of an unknown nature with the curve (62) of the reference values of the imaginary part (Im) corresponding to an annular space filled with gas makes it possible to determine the nature of the fluid present in this annular space, and it in particular makes it possible to determine whether this fluid is a gas or freshwater or seawater.

The curves representing the real part (Re) and the imaginary part (Im) of the complex signals as a function of the frequency (F) are advantageously used together during step d) for comparison with reference values.

Furthermore, the curves representing the modulus (M) and/or the phase (P) and/or the real part (Re) and/or the imaginary part (Im) of the measured complex signals as a function of the frequency (F) generally have at least one resonance peak, in particular when the frequency scanning covers determined frequencies varying between 10 Hz and 10 MHz, advantageously between 1 kHz and 5 MHz, preferably between 100 kHz and 3 MHz. This electric resonance phenomenon is in particular related to the inductances of the electrical cables connecting the electrodes to the impedance or transmittance measuring apparatus. Indeed, a pair of electrodes is globally comparable to a capacitance (capacitor), and when it is connected in parallel to an inductance (here that of the cable), one obtains a resonant circuit whereof the resonance frequency is inversely proportional to the square root of the product of the capacitance by the inductance. Furthermore, it has been discovered that the resonance frequency of a resonance peak varies as a function of the nature of the fluid contained in the annular space of the flexible line, the resonance frequency in the presence of an annular space filled with water being significantly lower than that in the presence of an annular space filled with gas. This phenomenon is consistent with the fact that water has a significantly higher electrical permittivity than that of gases, and in particular of air, such that the capacitance across the terminals of a pair of electrodes increases significantly when the annular space is flooded, which results in decreasing the resonance frequency.

The flooding of the annular space of a flexible line can therefore be detected by comparing the resonance frequency of the resonance peak with a reference value determined during a calibration on a flexible line including an annular space filled with gas. In reference to FIGS. 7 to 10, the resonance frequency of a resonance peak (33, 43, 53, 63) is measured on at least one of the curves representing the modulus (M) and/or the phase (P) and/or the real part (Re) and/or the imaginary part (Im) of the measured complex signals as a function of the frequency (F). Next, this measured resonance frequency is compared with a reference value that is the resonance frequency of the resonance peak (34, 44, 54, 64) determined on at least one of the reference curves (32, 42, 52, 62), which makes it possible to determine the frequency shift (D) that is equal to the difference between the reference resonance frequency on the one hand and the measured resonance frequency on the other hand. In practice, when the annular space contains a gas, the frequency shift (D) is small, i.e., generally less than 1 kHz. On the contrary, when the annular space contains a liquid, in particular water, the frequency shift (D) is large, i.e., generally greater than 5 kHz.

Also and so as to obtain measurements and an optimal use of the results, it can be preferable to perform a static measurement. Thus, during steps b) and c), it is preferable to keep the distance separating the electrodes (101, 102, 103, 104) of the or each of the pairs of electrodes (101, 102, 103, 104). This distance is advantageously between 200 mm and 500 mm. This then makes it possible to guarantee that there are enough armors (15) arranged between the electrodes (101, 102, 103, 104) of the or each of the pairs of electrodes (101, 102, 103, 104) for the measurement to be optimal, generally between 8 and 20 armors.

The invention claimed is:

1. A method for nondestructive inspection of a flexible line comprising at least one armor layer arranged inside an annular space and an external sheath surrounding said annular space, said annular space comprising a fluid, the method comprising:
   a) arranging, outside said flexible line, at least one pair of electrodes in the vicinity of the external sheath,
   b) supplying alternating voltage of determined frequency, or alternating current of determined frequency, or pulsed voltage, or pulsed current, to said pair of electrodes, or a first pair of electrodes of said pairs of electrodes, so as to generate an electromagnetic field extending through at least part of the annular space, and to subject an assembly formed by armors and the fluid to said electromagnetic field,
   c) measuring, at said pair of electrodes, or at a second pair of electrodes of said pairs of electrodes, an electrical signal related to electromagnetic characteristics of said at least one part of the annular space subject to said generated electromagnetic field, d) comparing said electrical signal with reference values so as to determine a nature of the fluid contained in the annular space.

2. The method according to claim 1, wherein during arranging, outside said flexible line, at least one pair of electrodes in the vicinity of the external sheath, a single pair of electrodes is arranged near the external sheath.

3. The method according to claim 2, wherein a sole armor layer, or when the flexible line comprises several armor layers, an armor layer closest to the external sheath, comprises at least a first group of armors and a second group of armors separate from one another and wherein arranging, outside said flexible line, at least one pair of electrodes in the vicinity of the external sheath comprises:

a1) arranging a first electrode from the sole pair of electrodes opposite the first group of armors, a2) arranging a second electrode from the sole pair of electrodes opposite the second group of armors.

4. The method according to claim 2, wherein the electrical signal measured during the measuring, at said pair of electrodes, or at a second pair of electrodes of said pairs of electrodes, the electrical signal related to electromagnetic characteristics of said at least one part of the annular space subject to said generated electromagnetic field is the complex impedance across the terminals of said sole electrode pair.

5. The method according to claim 4, wherein comparing said electrical signal with reference values so as to determine a nature of the fluid contained in the annular space comprises:

d1) comparing the modulus and/or the phase of the measured electrical signal with reference values so as to determine the nature of the fluid contained in the annular space.

6. The method according to claim 1, wherein during arranging, outside said flexible line, at least one pair of electrodes in the vicinity of the external sheath, two electrode pairs are arranged in the vicinity of the external sheath, with on the one hand a first pair of electrodes and on the other hand a second pair of electrodes.

7. The method according to claim 6, wherein a sole armor layer, or when the flexible line comprises several armor layers, the armor layer closest to the external sheath, comprises at least a first group of armors and a second group of armors separate from one another, and wherein arranging, outside said flexible line, at least one pair of electrodes in the vicinity of the external sheath comprises:

a3) arranging a first electrode from the first pair of electrodes opposite the first group of armors, a4) arranging a second electrode from the first pair of electrodes opposite the second group of armors.

8. The method according to claim 7, wherein arranging, outside said flexible line, at least one pair of electrodes in the vicinity of the external sheath comprises:

a5) arranging a first electrode from the second pair of electrodes opposite the first group of armors, a6) arranging a second electrode from the second pair of electrodes opposite the second group of armors.

9. The method according to claim 7, wherein a sole armor layer, or when the flexible line comprises several armor layers, the armor layer closest to the external sheath, comprises at least a third group of armors and a fourth group of armors separate from one another and separate from the first group of armors and the second group of armors, said third group of armors and said fourth group of armors being arranged between said first group of armors and said second group of armors, and wherein arranging, outside said flexible line, at least one pair of electrodes in the vicinity of the external sheath comprises:

a7) arranging a first electrode from the second pair of electrodes opposite the third group of armors, a8) arranging a second electrode from the second pair of electrodes opposite the fourth group of armors.

10. The method according to claim 7, wherein the electrical signal measured during the measuring, at said pair of electrodes, or at a second pair of electrodes of said pairs of electrodes, the electrical signal related to electromagnetic characteristics of said at least one part of the annular space subject to said generated electromagnetic field is a complex signal, the modulus of said complex signal is equal to the amplitude of the voltage measured across the terminals of the second pair of electrodes, and the phase of said complex signal being equal to the phase shift measured between the voltage across the terminals of the second pair of electrodes on the one hand, and the voltage or the current supplying the first pair of electrodes on the other hand.

11. The method according to claim 1, wherein arranging, outside said flexible line, at least one pair of electrodes in the vicinity of the external sheath comprises:

a9) arranging the electrodes of at least one pair of electrodes in contact with the external sheath.

12. The method according to claim 1, wherein supplying alternating voltage of determined frequency, or alternating current of determined frequency, or pulsed voltage, or pulsed current, to said pair of electrodes, or a first pair of electrodes of said pairs of electrodes comprises:

b1) supplying alternating voltage, or alternating current, with a determined frequency between 10 Hz and 10 MHz, advantageously between 100 kHz and 3 MHz, preferably between 200 kHz and 800 kHz.

13. The method according to claim 1, wherein during the supplying alternating voltage of determined frequency, or alternating current of determined frequency, or pulsed voltage, or pulsed current, to said pair of electrodes, or a first pair of electrodes of said pairs of electrodes, or during the measuring, at said pair of electrodes, or at a second pair of electrodes of said pairs of electrodes, an electrical signal related to electromagnetic characteristics of said at least one part of the annular space subject to said generated electromagnetic field, the distance separating the electrodes of the or each of the pairs of electrodes is kept fixed.

14. The method according to claim 13, wherein the distance separating the electrodes of the or each of the pairs of electrodes is between 100 mm and 500 mm, preferably between 200 mm and 500 mm.

15. The method according to claim 1, wherein the supplying alternating voltage of determined frequency, or alternating current of determined frequency, or pulsed voltage, or pulsed current, to said pair of electrodes, or a first pair of electrodes of said pairs of electrodes, the measuring, at said pair of electrodes, or at a second pair of electrodes of said pairs of electrodes, an electrical signal related to electromagnetic characteristics of said at least one part of the annular space subject to said generated electromagnetic field and the comparing said electrical signal with reference values so as to determine a nature of the fluid contained in the annular space is carried out several times, simultaneously or sequentially, with a different determined frequency for each execution.

16. A device for the nondestructive inspection of a flexible line comprising at least one armor layer arranged inside an annular space and an external sheath surrounding said annular space, said annular space comprising a fluid, wherein said device comprises:
- an electromagnetic field generator configured to generate an electromagnetic field extending through at least part of the annular space, said electromagnetic field generator comprising:
- at least one pair of electrodes intended to be arranged, outside said flexible line, in the vicinity of the external sheath,
- a voltage or current generator, configured to supply alternating voltage of determined frequency, or pulsed voltage, respectively alternating current of determined frequency, or pulsed current, to said pair of electrodes, or a first pair of electrodes of said pairs of electrodes, so as to generate an electromagnetic field extending through at least part of the annular space, and thus to subject an assembly formed by armors and the fluid to said electromagnetic field,
- a measuring instrument configured to measure, at said pair of electrodes, or a second pair of electrodes of said pairs of electrodes, an electrical signal related to the electromagnetic characteristics of said at least one part of the annular space subject to said generated electromagnetic field,
- a comparator configured to compare said electrical signal with the reference values so as to determine the nature of the fluid contained in the annular space.

17. The device according to claim 16, wherein the electrodes of the pair(s) of electrodes comprise a conductive body made from metal, preferably from copper.

18. The device according to claim 17, wherein the conductive body of the electrodes has a parallelepiped shape with a rectangular base, the length and width of which are between 20 mm and 250 mm, preferably with a square base with sides equal to 70 mm.

19. The device according to claim 16, wherein the measuring instrument is a vector network analyzer.

* * * * *